United States Patent [11] 3,601,020

[72] Inventors Hubertus Reimann;
 Hans-Joachim Daeche, both of Dresden, Germany
[21] Appl. No. 708,171
[22] Filed Feb. 26, 1968
[45] Patented Aug. 24, 1971
[73] Assignee SVEB Pentacon Dresden Kamera-und Kinowerke
 Dresden, Germany

[54] PHOTOGRAPHIC CAMERA
 8 Claims, 3 Drawing Figs.
[52] U.S. Cl. ................................................. 95/10 C,
 95/53 EL, 95/64 R
[51] Int. Cl. ....................................................... G03b 7/08,
 G03b 9/06, G03b 17/18
[50] Field of Search............................................ 95/10 C,
 53, 64

[56] References Cited
 UNITED STATES PATENTS
3,292,515  12/1966  Sato et al. ..................... 95/10 C 3,397,629   8/1968  Mori et al. ..................... 95/10 C
3,418,479  12/1968  Schmitt ......................... 95/10 C UX
3,425,328   2/1969  Ichijo et al. ................... 95/10 C
3,460,450   8/1969  Ogihara ......................... 95/10 C
3,466,447   9/1969  Fahlenberg .................... 95/10 C UX Primary Examiner—Samuel S. Matthews
Assistant Examiner—Joseph F. Peters, Jr.
Attorney—Young & Thompson ABSTRACT: A photographic camera having an automatic exposure control circuit including a photoelectric resistance in which an exposure factor setting control influences the operation of a switching means which operates a magnetic-locking device. The locking device when operated locks the exposure factor-setting control in a position required for accurate exposure. A light indicator includes at least one lamp connected in circuit with a switch device operated by the switch means, a first switch closed by the initial movement of the exposure factor-setting control and a second switch closed by the exposure factor-setting control when it reaches its maximum exposure setting. The switches and switching device are effective to connect a lamp of the light indicator to a source of supply current to indicate a danger of incorrect exposure.

INVENTORS
HUBERTUS REIMANN
HANS-JOACHIM DAECHE
BY Young & Thompson
ATTYS.

PHOTOGRAPHIC CAMERA

BACKGROUND OF INVENTION

Cameras are already known in which simultaneously with the alteration of the lens diaphragm a movement is imparted to diaphragm which is situated in front of a photoelectric resistance. When the correct lens diaphragm aperture for a correct exposure is reached, the photoelectric resistance causes an electronic switching stage to respond, by which the movement of the lens diaphragm is stopped. The camera shutter is then actuated.

In diaphragm control systems of this kind the photoelectric resistance is subjected to varying illumination intensities during the measuring process, so that all the errors caused by the inertia by the photoelectric resistance are reflected in the diaphragm setting. These diaphragm control systems, therefore, only permit an accurate exposure setting if the change of illumination of the photoelectric resistance is only small, or alternatively the movement of the diaphragm situated in front of the photoelectric resistance takes place so slowly that snapshots are no longer possible.

The purpose of the invention is to increase the range of exposure, for an exposure factor to be set in accordance with the light conditions, with a reduced setting time.

According to the invention in a photographic camera having a plurality of exposure factor setting controls there is provided an automatic exposure control circuit comprising a photoelectric resistance influenced by prevailing light conditions, a variable potential divider connected in circuit with the photoelectric resistance which potential divider is variable concomitantly with one of said exposure factor setting controls by means of an exposure factor setting device, a variable resistance device connected in circuit with the photoelectric resistance and variable potential divider, presettable by means of the other of said exposure factor setting controls, switch means influenced to operate by the variable resistance device, the variable potential divider and the photoelectric resistance and an electromagnetic locking device operable by the switch means and engageable with said exposure factor setting device, and a light indicator including at least one lamp a source of supply current for the light indicator, a switch device operable by the switch means, a first switch connected in circuit with the switch device and a lamp of the light indicator which switch is closed by the initial movement of the exposure factor setting device, a second switch connected in circuit with a lamp of the light indicator and the source of supply current which second switch is closed by the exposure factor setting device when it reaches its maximum exposure setting, wherein when the circuit is connected to a source of suitable supply potential and the variable resistance device is preset by means of said other exposure factor setting controls, said one of the exposure factor setting devices is movable until locked by the locking device in a position required for accurate exposure, the switching device when operated and the first switch when closed are effective to connect the source of supply current to a lamp of the light indicator whereby a risk of overexposure of the film is indicated, and the second switch when closed is effective to connect the source of supply current to a lamp of the light indicator whereby a risk of under exposure of the film is indicated.

The invention ensures that the inertia of the photoelectric resistance cannot take effect at all, as the setting of the variable potential divider is not influenced by a change of lens diaphragm aperture, the photoelectric resistance being subjected to a substantially constant luminous intensity for constant prevailing light conditions. Consequently, the time of the setting operation can be considerably shortened and the range of exposure widened.

The variable potential divider may be coupled with either the exposure time setting device of the camera or preferably to the diaphragm aperture control of the camera and may comprise a resistance attenuation element. The operation of setting the preselectable exposure factors is carried out either manually, electrically or electrooptically. In order to indicate whether the range of exposure possible by the variations of the second exposure possible by the variations of the second exposure factor setting device is exceeded, in those cases where there is a possibility of overexposure or underexposure at respective limits of movement switches operable by the exposure factor setting device are included, which, in conjunction with a switching device directly or indirectly controllable by the switching stage, cause light signals to become visible in the viewfinder or cause the camera release mechanism to be locked.

A constructional form of the invention for controlling diaphragm aperture will now be described by way of example with reference to the accompanying drawings in which.

DESCRIPTION OF PREFERRED EMBODIMENT

Figure 1:
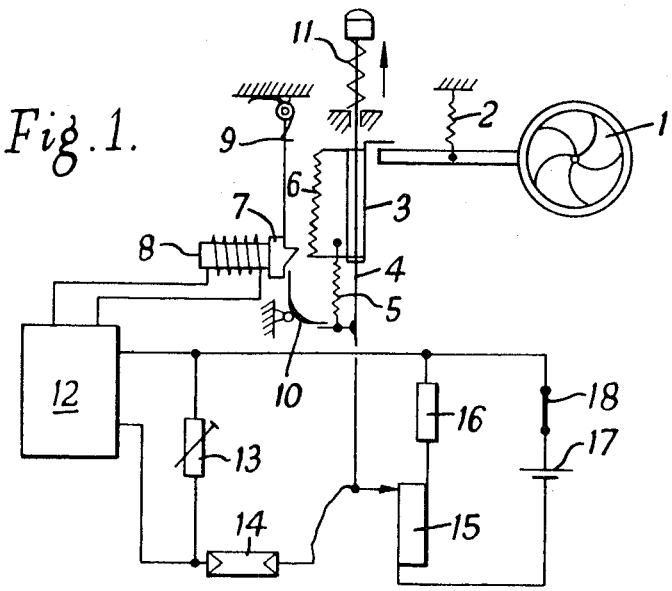
FIG. 1 is a diaphragm control mechanism with a control switching system.

In FIG. 1 the lens diaphragm 1 is movable in opposition to the action of a spring 2, by means of a sleeve 3. The sleeve 3 is mounted on a release bar 4 and connected to the latter by a spring 5. At the same time the sleeve 3 is provided with a system of teeth 6 which can be engaged by an armature 7 of an electromagnet 8. The armature 7 is loaded by a torsion spring 9 can be caused to come to rest against the magnet 8, being moved by an elastic member 10 is the release bar which is in contact with the release bar 4, movable in the direction shown by the arrow under the action of the spring 11. The said magnet is fed by a switch means 12 which is controlled, in accordance with the light conditions, from a network consisting of an adjustable resistance 13, a photoelectric resistance 14, a resistance attenuation device 15 coupled with a the release bar 4, and a fixed resistance 16. A battery 17 and an operating switch 18 are provided.

Figure 2:
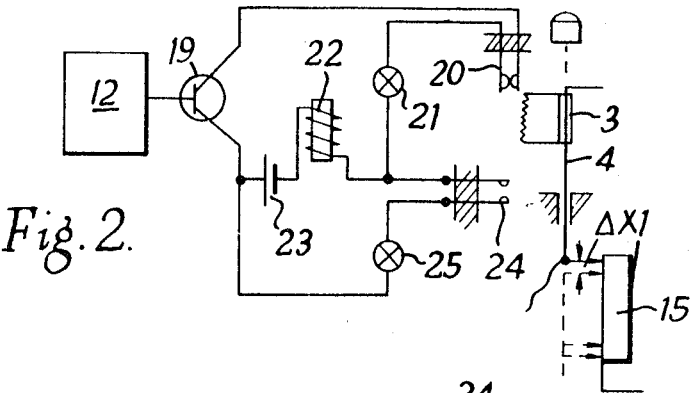
FIG. 2 is a switching system for indication of the limits of movement of the control mechanism and for locking the release mechanism.

According to FIG. 2 the switch means 12 is followed by a transistor 19 which, in conjunction with a switch 20 that can be closed by means of a sleeve 3 in the case of the minimum diaphragm aperture, forms a switch combination for a lamp 21 visible in the viewfinder of the camera and also for a magnet 22, these two latter devices being fed from a battery 23. The switch 24 can be closed by the sleeve 3 in the lower end position, and the lamp 25 indicates this position.

Figure 3:
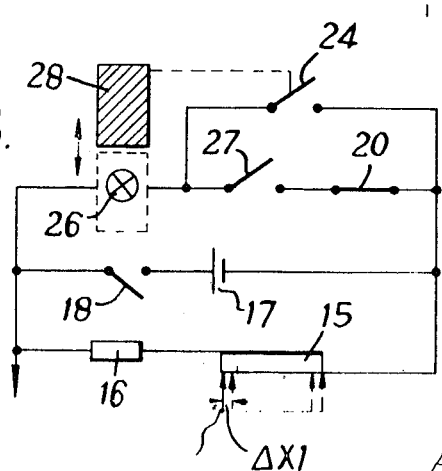
FIG. 3 is a switching system providing a separate indication for each limit of movement of the control mechanism.

According to FIG. 3 a limit value indicating system is provided which, by means of one lamp only, enables both the upper and the lower limit of the possible diaphragm settings to be identified. For this purpose the switch 20, as well as a switch 27 can be closed by the armature 7 when the armature disengages the teeth, are connected in series with the lamp 26. The switch 24 is connected in parallel with the foregoing switch combination. The red filter 28 is moved into position in front of the lamp 26 when the diaphragm has reached its maximum opening and the switch 24 has been closed.

The method of operation is as follows:

After the preselectable exposure factors, such as film speed and shutter time, has been taken into account by adjusting the resistance 13, and after the closure of the switch 18, the switch means 12, e.g. a transistorized trigger insensitive to battery voltage alterations, is fed, and the holding electromagnet 8, by which the armature 7 is secured, in opposition to the action of the spring 9, is likewise fed, via the said switch means. The release bar 4 can now be moved by hand. As it is coupled with the sleeve 3, this latter is also moved, and the diaphragm 1 is opened at the same time.

An indication of the setting of the diaphragm is fed back to the switch means by means of the slider of the resistance attenuation element 15 which slider is also coupled with the release bar 4. Resistance attenuation elements of this kind are known as high-frequency voltage dividers. When the release bar 4 is pressed this causes an increase in the voltage tapped off from the attenuation elements 15, so that the voltage across the resistance 13 likewise increases. When this latter voltage has reached a certain minimum the switch means 12 is switched off and the holding magnet 8 becomes deenergized. The armature 7 thus moves into engagement with the system of teeth 6 and stops the movement of the sleeve 3, so that the diaphragm blades are secured in the opened position which the diaphragm had reached at that moment. The diaphragm has thus been set to the aperture required for correct exposure prior to the opening of the camera shutter. As the sleeve 3 is merely coupled via the spring 5 with the release bar 4, this latter can continue to be pressed, despite the fact that the sleeve 3 is locked and the shutter can be released. After the exposure has taken place the slider of the attenuation element and the diaphragm blades are caused by the return movement of the release bar 4 to resume their initial position, the elastic member 10 causing the armature 7 to come to rest once more against the magnet 8.

If the light conditions are such that even with the minimum diaphragm aperture, i.e. when the tap on the attenuation element 15 is positioned within the section $\Delta x_1$, the switch means 12 is switched on, the transistor 19 conducts, as shown in FIG. 2, and closes the current circuit for the lamp 21, since in this case the switch 20 has likewise been closed, by means of the sleeve 3, which is only shown schematically. The lamp 21 then comes on and shows that the exposure factor combinations to which the camera has been set would result in an overexposure of the film. Since, in addition, the magnet 22 is being fed, the release bar 4 is prevented from being pressed to a greater distance by means of an armature of the magnet 22 which armature engages with the release mechanism.

If light conditions are insufficient the release bar is pressed until the diaphragm 1 reaches its maximum aperture. In this position the switch 24 is closed by the sleeve 3. The lamp 25 thus comes on and indicates a danger of underexposure. At the same time the magnet 22 locks the release mechanism.

In the system shown in FIG. 3, overexposure and underexposure are indicated as follows:

If light conditions are such that even with the minimum diaphragm aperture, i.e. when the sleeve 3 is in the upper position, where a switch 20 is kept closed by the sleeve 3 and the tap of the attenuation element 15 is still situated within $\Delta x1$, the armature 7 blocks the sleeve 3, and closes the switch 27. This causes the yellow lamp 26 to come on, indicating the danger of overexposure.

In contrast to the above, the sleeve 3 is movable to its maximum extent when light conditions are inadequate. First of all, this sleeve, as soon as it departs from its upper position, opens the switch 20. If the sleeve moves into the vicinity of its lower position, then a red filter 28 is moved into position in front of the yellow lamp 26. If the movement of the sleeve 3 and thus the opening of the diaphragm are not stopped, then the sleeve reaches its lower final position. In this position the switch 24 is closed and a red light signal appears in the viewfinder as an indication of the danger of underexposure. It is also possible, however, to dispense with the displaceable red filter 28. In this case, the lamp 26 can be colored red, thus providing a red warning signal whenever the exposure requirement is outside of the rand of diaphragm variation. The release-locking mechanism already explained may also be included and may operate simultaneously with the lighting of the lamp.

Although the foregoing description of the invention relates to a diaphragm control system it is by no means confined to the latter. It could also be used for controlling the exposure time control in accordance with the light conditions, in which case the sleeve 3 would be connected with the exposure time control instead of the diaphragm aperture control and exposure factors dependent on film speed and diaphragm aperture would be taken into account by means of the adjustable resistance 13.

We claim:

1. In a photographic camera having a plurality of exposure factor setting controls the provision of an automatic exposure control circuit comprising a photoelectric resistance influenced by prevailing light conditions; a variable potential divider connected in circuit with the photoelectric resistance which potential divider is variable concomitantly with one of said exposure factor setting controls by means of an exposure factor setting device; a variable resistance device, connected in circuit with the photoelectric resistance and variable potential divider, presettable by means of the other of said exposure factor setting controls; switch means influenced to operate by the variable-resistance device, the variable potential divider and the photoelectric resistance; an electromagnetic locking device operable by the switch means and engageable with said exposure factor setting device; and a light indicator including at least one lamp, a source of supply current for the light indicator; a switch device operable by the switch means, a first switch connected in circuit with the switch device and a lamp of the light indicator which switch is closed by the initial movement of the exposure factor setting device; and, a second switch connected in circuit with a lamp of the light indicator and the source of supply current which second switch is closed by the exposure factor setting device when it reaches its maximum exposure setting wherein when the circuit is connected to a source of suitable supply potential and the variable-resistance device is preset by means of said other exposure factor setting controls said one of the exposure factor setting devices is movable until locked by the locking device in a position required for accurate exposure, the switching device when operated and the first switch when closed are effective to connect the source of supply current to a lamp of the light indicator whereby a risk of overexposure of the film is indicated, and the second switch when closed is effective to connect the source of supply current to a lamp of the light indicator whereby a risk of under exposure of the film is indicated.

2. A photographic camera according to claim 1 wherein the variable potential divider is a resistance attenuation element.

3. A photographic camera according to claim 1 wherein said exposure factor setting device is movable by the shutter release mechanism of the camera.

4. A camera according to claim 1 wherein the switching device is an electronic switch.

5. A camera according to claim 1 wherein the switching device operable by the switch means is actuated by an armature of the electromagnetic locking device 6. A camera according to claim 1 wherein the light indicator includes a single lamp and there is provided a colored filter movable by the exposure factor setting device into a position in front of the lamp before the exposure factor setting device reaches its maximum exposure setting whereby a different colored light indication distinguishes between a risk of under or over exposure of the film.

7. A camera according to claim 1 wherein the light indicator includes a first lamp operable by the switching device and first switch; and a second lamp of different color to the first operable by the second switch thereby distinguishing between a risk of under or over exposure of the film.

8. A camera according to claim 1 wherein the exposure factor setting device is movable by the shutter release mechanism of the camera and there is provided an electromagnet having an armature engageable with the shutter release mechanism, which electromagnet is connected in series with the source of supply current and energized together with the light indicator when a risk of incorrect exposure occurs, whereby the armature engages the release mechanism and prevents operation of the shutter.